US008304046B2

(12) United States Patent
Zhao

(10) Patent No.: US 8,304,046 B2
(45) Date of Patent: Nov. 6, 2012

(54) ENCAPSULATED GETTER ARRANGED IN VACUUM GLAZING

(75) Inventor: Ning Zhao, Beijing (CN)

(73) Assignee: Beijing Synergy Vacuum Glazing Technology Co., Ltd., Beijing (CN)

(*) Notice: Subject to any disclaimer, the term of this patent is extended or adjusted under 35 U.S.C. 154(b) by 379 days.

(21) Appl. No.: 12/755,528

(22) Filed: Apr. 7, 2010

(65) Prior Publication Data
US 2011/0006252 A1 Jan. 13, 2011

(30) Foreign Application Priority Data
Jul. 10, 2009 (CN) .................... 2009 2 0163967 U

(51) Int. Cl.
*E06B 3/66* (2006.01)
*E06B 7/12* (2006.01)
*E04C 2/54* (2006.01)

(52) U.S. Cl. ........ 428/34; 52/172; 52/786.1; 52/786.13; 252/181.1

(58) Field of Classification Search .................... 428/34; 52/172, 786.1, 786.13; 252/181.1; 313/553; 417/48
See application file for complete search history.

(56) References Cited

U.S. PATENT DOCUMENTS
6,415,561 B2 * 7/2002 Thompson, Jr. ................ 52/172

FOREIGN PATENT DOCUMENTS
| CN | 1359127 | * | 7/2002 |
| CN | 2522579 Y | * | 11/2002 |
| CN | 1621653 A | * | 6/2005 |

OTHER PUBLICATIONS
WO 03/043904, May 2003.*

* cited by examiner

*Primary Examiner* — Donald J Loney
(74) *Attorney, Agent, or Firm* — Howard M. Gitten; Edwards Wildman Palmer LLP

(57) ABSTRACT

An encapsulated getter arranged in vacuum glazing comprising an encapsulating box and a getter placed in the encapsulating box. The encapsulating box forms a closed cavity, and there is a gap between the getter and an inner surface of the encapsulating box. The position of the getter can be fixed with respect to the encapsulating box by filling material which is air permeable and thermal insulating in the gap.

4 Claims, 3 Drawing Sheets

ENCAPSULATED GETTER ARRANGED IN VACUUM GLAZING

CROSS REFERENCED TO RELATED APPLICATION

This application claims priority to Chinese patent application no. 200920163967.6 filed on Jul. 10, 2009. The entire contents of the aforementioned patent application are incorporated herein by this reference.

BACKGROUND OF THE INVENTION

This utility model relates to encapsulated getter, especially to encapsulated getter arranged in vacuum glazing.

The manufacture and application of the vacuum glazing have entered a practical stage. In order to prolong the vacuum state of the glass, the inventor of the present application has described a method to use the encapsulated getter and thus manufactured vacuum glazing in his or her patents (e.g. Chinese Patents ZL200310115169.3, ZL00140012.9, and ZL01275879.5). The usage of the encapsulated getter has greatly improved the quality and vacuum life of the vacuum glazing. The above-mentioned prior applications are incorporated here as prior arts of this utility model.

In the above prior arts, problems occur during the usage of the encapsulated getter. The key problem is that, due to the direct and close contact between the casing of the encapsulated getter and the inner getter, when the encapsulated getter is opened or broken by laser, the getter will get damaged by heat which is rapidly and directly conducted to the getter, therefore, the quality of the getter is reduced, or even partial effectiveness of the getter is lost. Thus, the quality and vacuum life of the vacuum glazing are reduced.

BRIEF SUMMARY OF THE INVENTION

An object of this invention is to solve the above technical problems in the prior arts.

According to an aspect of the invention, a practical structure of an encapsulated getter arranged in vacuum glazing is proposed. The encapsulated getter comprises an encapsulating box and a getter arranged in the encapsulating box, characterized in that, the encapsulating box forms a closed cavity, and there is a gap between the getter and an inner surface of the encapsulating box.

According to another aspect of the encapsulated getter arranged in vacuum glazing of the utility model, wherein filling material which is air permeable and thermal insulating is arranged in the gap, thereby the position of the getter is fixed with respect to the encapsulating box, which further prevents the getter from being hurt by the heat produced by using laser to open or break the encapsulated getter.

According to another aspect of the encapsulated getter arranged in vacuum glazing of the utility model, wherein the encapsulating box comprises two or more brackets extending outwards along a bottom surface of the encapsulating box, and the thickness of the brackets is equal to or smaller than the thickness of pillars of the vacuum glazing.

According to another aspect of the encapsulated getter arranged in vacuum glazing of the utility model, wherein the encapsulating box is made of film-like glass or metallic material which can be broken by laser light.

By employing the above technical solutions of this utility model, there is a gap or air permeable and thermal insulating filling material between the casing of the encapsulated getter (i.e. the above-mentioned encapsulating box) and the getter arranged in the casing of the encapsulated getter, thus, the heat will not be directly exerted on the inner getter when the encapsulated getter is opened or broken by laser, thereby thermal damage to the getter will be greatly reduced or even eliminated, therefore, the getter can keep active for a long time. In this way, the quality of the vacuum glazing is improved, and the vacuum life of the vacuum glazing is prolonged.

BRIEF DESCRIPTION OF THE DRAWINGS

According to the above design proposals of this utility model, several embodiments for demonstration are provided, wherein.

DETAILED DESCRIPTION OF THE PREFERRED EMBODIMENT

In the following, the detailed embodiments of this utility model will be described in combination with the figures.

Figure 1A:
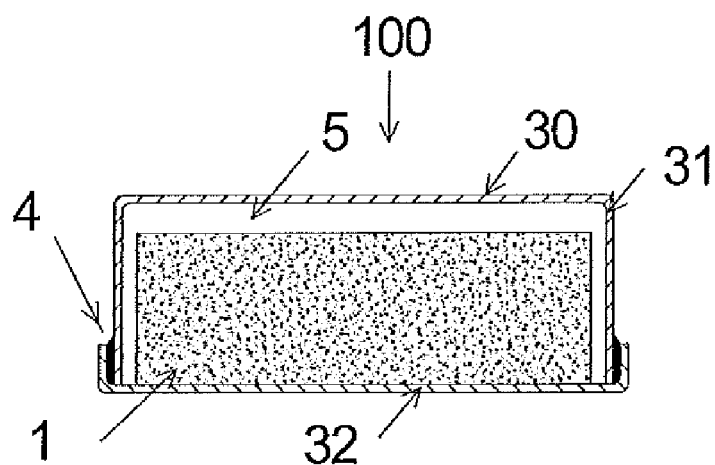
FIG. 1(a) to FIG. 1(c) are examples of the encapsulated getter according to the first embodiment of this invention as well as a vacuum glazing product accommodating such encapsulated getter.
Figure 1B:
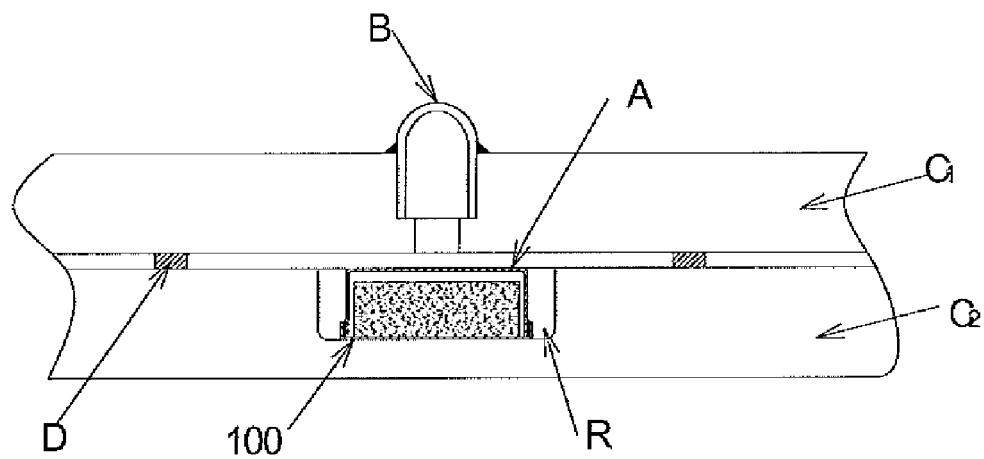
Figure 1C:
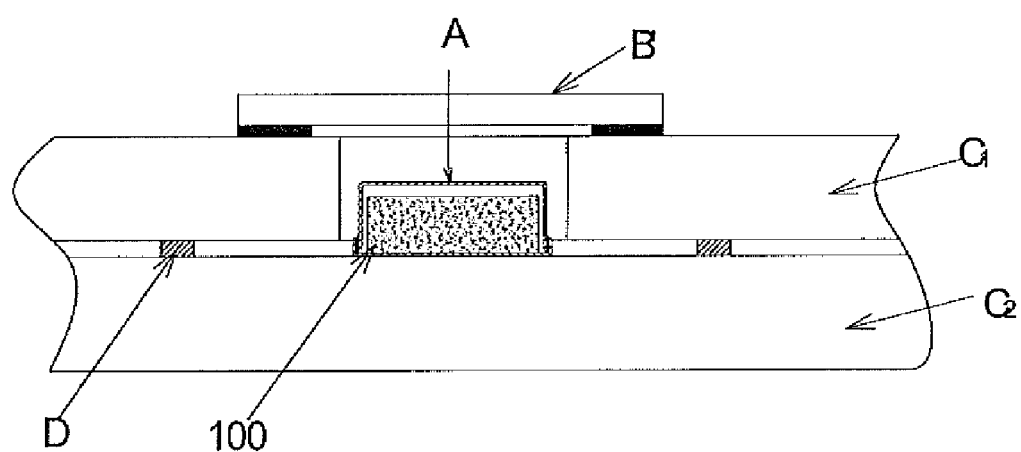

FIG. 1(a) to FIG. 1(c) are examples of the encapsulated getter according to the first embodiment of this invention as well as a vacuum glazing product accommodating such encapsulated getter.

FIG. 1(a) shows the construction of the encapsulated getter according to the first embodiment of this invention. As illustrated in FIG. 1(a), the encapsulated getter 100 includes a cavity formed by an encapsulating box 30 and getter 1 arranged in the cavity. The encapsulating box 30 consists of an upper portion 31 and a lower portion 32 clasping each other, and the clasping portion is sealed by brazing material 4. As showed in the figure, the volume of the getter 1 is slightly smaller than the volume of the cavity formed by the encapsulating box 30; thereby a gap 5 occurs between the getter 1 and the inner surface of the encapsulating box 30 when the getter 1 is put inside of the encapsulating box 30.

FIG. 1(b) shows a case when the encapsulated getter 100 of FIG. 1(a) is placed in vacuum glazing, and specifically shows the position relationship of the encapsulated getter 100 with respect to a pump-out hole B, an upper glass sheet C1, a lower glass sheet C2 and a pillar D of the vacuum glazing. Please refer to the above-mentioned prior arts for the manufacture of vacuum glazing. The difference is that a concave area R which accommodates the bottom of the encapsulated getter 100 is manufactured on the position where the lower glass sheet C2 faces the pump-out hole B. An arrow A indicates a punch direction along which the laser penetrates through the encapsulated getter 100 to open or break it.

FIG. 1(c) shows a case when the encapsulated getter 100 of FIG. 1(a) is placed in another conventional vacuum glazing. As illustrated in FIG. 1(c), since the pump-out hole B of the vacuum glazing in FIG. 1(b) is replaced by an hole seal glass sheet B', the encapsulated getter 100 may be placed in the space formed by the upper glass sheet C1 and the hole seal glass sheet B' instead of manufacturing a concave area in the lower glass sheet C2. Also, the punch direction A may be perpendicular to and face the encapsulated getter 100 so as to make the operation simple and reliable.

Due to the existence of gap 5, the heat will not be directly exerted on the inner getter when the encapsulated getter 100 of FIG. 1(a) placed in vacuum glazing as illustrated in FIG. 1(b) or FIG. 1(c) is opened or broken by laser, thereby the thermal damage to the getter will be reduced or even eliminated, therefore, the getter can keep active for a long time, the quality of the vacuum glazing is improved, and the vacuum life of the vacuum glazing is prolonged.

The encapsulating box 30 of this embodiment can be made in many ways. For example, it may be formed by clasping an upper box part 31 and a lower box par 32 as showed in FIG. 1(a) to form a cavity, putting the getter 1 into the cavity, and melting brazing material 4 to seal the cavity. During this procedure, the brazing material 4 with low melting point is melt; thereby the getter 1 will not really get hurt by heat. FIG. 1(b) shows one conventional structure of vacuum glazing, wherein the encapsulated getter 100 is placed in the concave area R of the lower glass sheet C2, which directly faces the pump-out hole B.

Figure 2A:
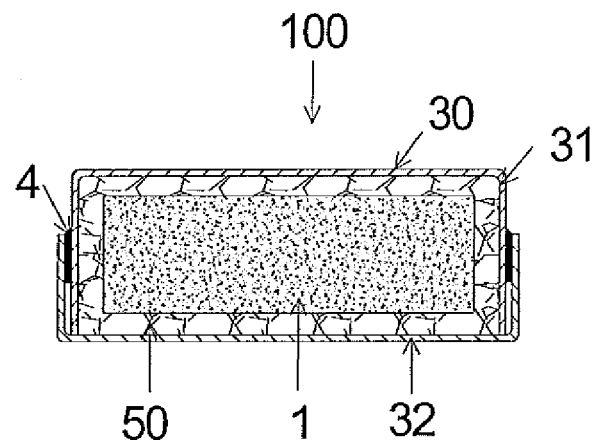
FIG. 2(a) to FIG. 2(c) are examples of the encapsulated getter according to the second embodiment of this invention as well as a vacuum glazing product accommodating such encapsulated getter.
Figure 2B:
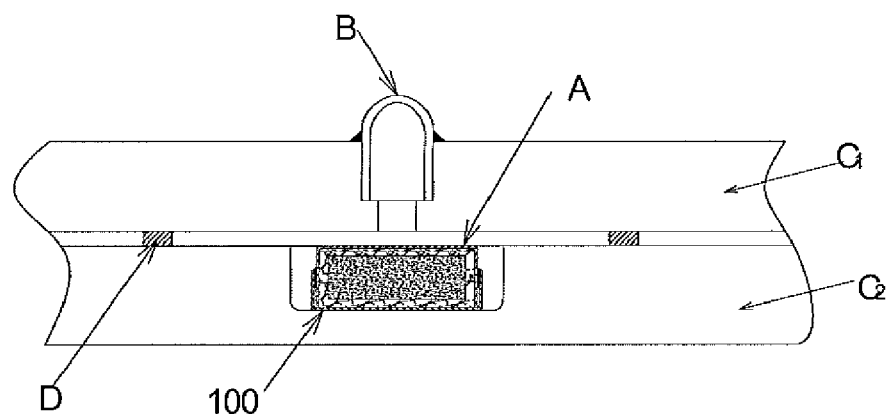
Figure 2C:
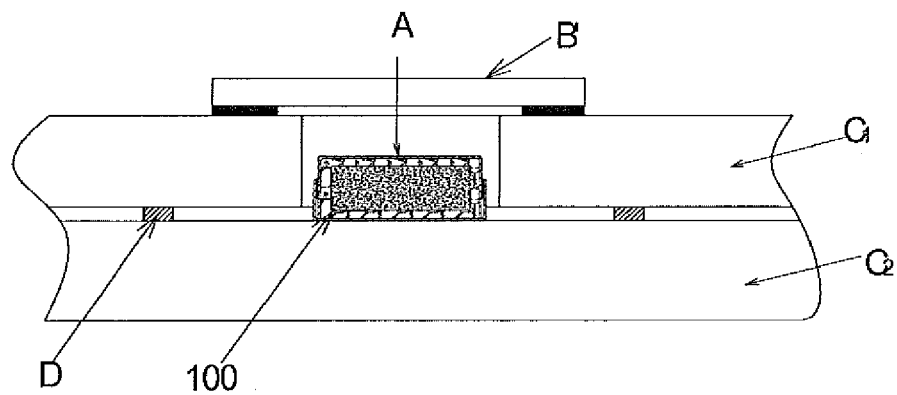

FIG. 2(a) to FIG. 2(c) are examples of the encapsulated getter according to the second embodiment of this invention as well as a vacuum glazing product accommodating such encapsulated getter.

FIG. 2(a) shows the structure of the encapsulated getter according to the second embodiment of this invention. As illustrated in FIG. 2(a), the encapsulated getter 100 includes a cavity formed by an encapsulating box 30, and getter 1 arranged in the cavity. As illustrated in FIG. 2(a), the volume of getter 1 is slightly smaller than that of the cavity formed by the encapsulating box 30, while the gap 5 formed by the getter 1 and the encapsulating box 30 is filled with filling material 50 which is air permeable and thermal insulating, such as glass wool, stainless steel wool, or other inorganic material, thereby the getter 1 is equivalent to be enclosed by a very thin protective lamina, i.e. a protective film, of the air permeable and thermal insulating filling material 50. Since the volume formed by the getter 1 and the filling material 50 fills the cavity formed by the encapsulating box 30, the getter 1 and the encapsulating box 30 is fixed with respect to each other.

Due to the existence of the filling material 50 in the gap 5, the heat will not be directly exerted on the inner getter when the encapsulated getter 100 of FIG. 2(a) placed in vacuum glazing as illustrated in FIG. 2(b) or FIG. 2(c) is opened or broken by laser, thereby the thermal damage to the getter will be reduced or even eliminated, therefore, the getter can keep active for a long time, the quality of the vacuum glazing is improved, and the vacuum life of the vacuum glazing is prolonged.

FIG. 2(b) and FIG. 2(c) show the cases where the encapsulated getter of FIG. 2(a) is placed in two kinds of conventional vacuum glazing. The description to these cases is similar to the above description of FIG. 1(b) and FIG. 1(c); thereby it will not be described here. It should be particularly pointed out that, because of the omnibearing protection of the protective film of the heat insulating filling material 50 to the getter 1, the direction of punching operation of laser irradiation can be freely selected, and the getter 1 will not get hurt by heat no matter along which direction the punch is performed so as to open or break the encapsulated getter 100.

The encapsulating box 30 in this embodiment can also be manufactured by casting seal of metal/glass, in addition to a method similar to the method of the embodiment illustrated in FIG. 1(a), i.e. in addition to a method of clasping an upper box part 31 and a lower box par 32 to accommodate the getter 1 enclosed by the protective film of the air permeable and thermal insulating filling material 50, and melting brazing material 4 to seal the cavity. During this procedure, material with low melting point (e.g. metals with low melting point such as nickel, or solder glass) is used to seal the getter enclosed by the protective film of the filling material 50, which forms the encapsulating box 30 after cooling down. During this procedure, the getter 1 will not really get hurt by heat due to the existence of the protective film of the filling material 50.

Figure 3A:
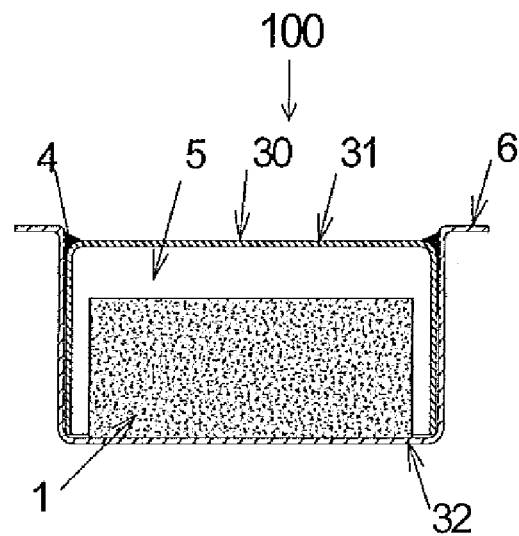
FIG. 3(a) to FIG. 3(c) are examples of the encapsulated getter according to the third embodiment of this invention as well as vacuum glazing product accommodating such encapsulated getter.
Figure 3B:
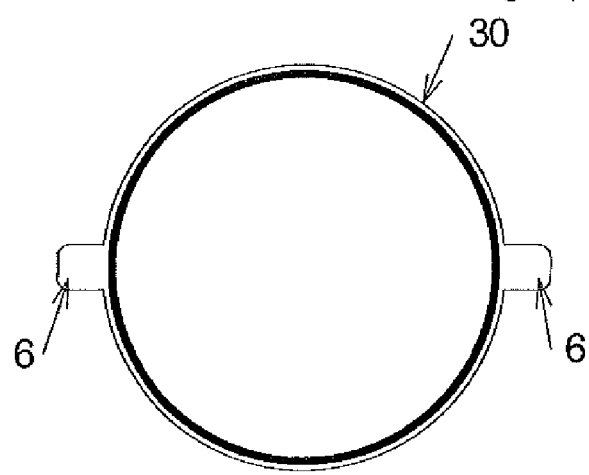
Figure 3C:
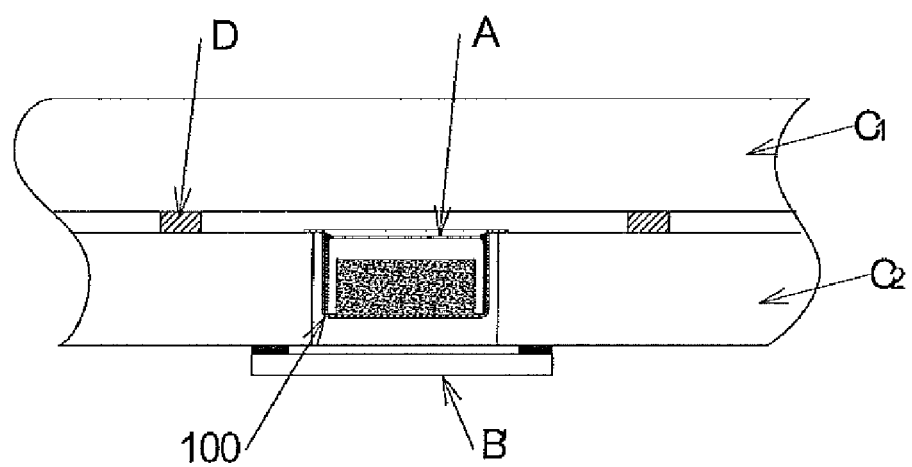

FIG. 3(a) to FIG. 3(c) are examples of the encapsulated getter according to the third embodiment of this invention as well as a vacuum glazing product accommodating such encapsulated getter.

FIG. 3(a) shows the structure of the encapsulated getter according to the third embodiment of this invention. As illustrated in FIG. 3(a), the structure of the encapsulated getter 100 is substantially the same as that of the FIG. 1(a), and the gap 5 therein could also be filled with the air permeable and thermal insulating filling material 50 as illustrated in FIG. 2(a). The differences between FIG. 3(a) and FIG. 1(a) and FIG. 2(a) are that the encapsulating box 30 is provided with two or more brackets 6 extending outwards along with a bottom surface of the encapsulating box, and the thickness of the brackets 6 is equal to or smaller than the thickness of pillars D of the vacuum glazing.

FIG. 3(b) shows the top view of the encapsulating box 30 provided with two brackets 6 extending outwards along with the bottom surface; however, there may be more brackets 6.

The benefits are that, as illustrated in FIG. 3(c), after the encapsulated getter 100 shown in FIG. 3(a) is placed at the pump-out hole of the lower glass sheet directly facing the hole seal glass sheet, because several brackets 6, whose thickness is equal to or smaller than the thickness of pillars D of the vacuum glazing, are situated between the upper glass sheet and the lower glass sheet, the brackets 6 fix the position of the encapsulated getter 100; therefore, the processing of the vacuum glazing as well as the opening (or breaking) of the encapsulated getter may be operated more conveniently.

By employing the above embodiments of this utility model, because of the function of the gap or the air permeable and thermal insulating filling material between the encapsulating box 30 of the encapsulated getter 100 and the getter 1 arranged in the encapsulating box 30, the heat will not be directly exerted on the getter 1 when the encapsulated getter 100 is opened or broken by laser, and the thermal damage to the getter 1 will be reduced or even eliminated, therefore, the getter 1 can keep active for a long time. In this way, the quality of the vacuum glazing is improved, and the vacuum life of the vacuum glazing is prolonged.

Although this utility model is illustrated by embodiments, a person skilled in the art may make variations and modifications to this utility model without departing from the spirit and scope of the invention, thus, the scope of protection of this utility model is defined by the attached claims.

What is claimed as new and desired to be protected by Letters Patent of the United States is:

1. An encapsulated getter arranged in vacuum glazing, comprising an encapsulating box; a getter placed in the encapsulating box, the encapsulating box forming a closed cavity, a gap formed between the getter and an inner surface of the encapsulating box; and two or more brackets extending outwards from the encapsulating box, along a bottom surface of the encapsulating box, a distance sufficient to be supported by the vacuum glazing, and a thickness of the brackets being equal to or smaller than a thickness of pillars of the vacuum glazing.

2. An encapsulated getter arranged in vacuum glazing according to claim 1, wherein filling material which is air permeable and thermal insulating is arranged in the gap, thereby the position of the getter is fixed with respect to the encapsulating box.

3. An encapsulated getter arranged in vacuum glazing according to claim 1, wherein the encapsulating box is made of at least one of film-like glass and metallic material which can be broken by laser light.

4. An encapsulated getter arranged in vacuum glazing according to claim 2, wherein the encapsulating box is made of at least one of film-like glass and metallic material which can be broken by laser light.

* * * * *